United States Patent [19]

Patzelt et al.

[11] Patent Number: 5,098,450
[45] Date of Patent: Mar. 24, 1992

[54] SURFACTANT ADDITIVE FOR HEC EMULSION

[75] Inventors: Robert R. Patzelt, Bloomfield Hills; Edwin C. Zuerner, Troy, both of Mich.

[73] Assignee: Nalco Chemical Company, Naperville, Ill.

[21] Appl. No.: 693,683

[22] Filed: Apr. 30, 1991

[51] Int. Cl.$^5$ .............................................. B01D 47/00
[52] U.S. Cl. ........................................ 55/45; 55/85; 55/DIG. 46; 210/712; 454/54
[58] Field of Search ............... 55/45, 85, 89, DIG. 46; 98/115.2; 210/712

[56] References Cited

U.S. PATENT DOCUMENTS

| | | | |
|---|---|---|---|
| 4,378,235 | 3/1983 | Cosper et al. ............. | 55/85 |
| 4,563,199 | 1/1986 | Lindenberger et al. ......... | 55/85 |
| 4,750,919 | 6/1988 | Patzelt et al. ............. | 55/45 |
| 4,919,691 | 4/1990 | Patzelt et al. ............. | 55/45 |
| 4,959,147 | 9/1990 | Huang et al. ............. | 210/712 |

OTHER PUBLICATIONS

"Paint Spray Booth Sludge Handling", Shu-Jen W. Huang, presentation at SME Automation of Paint Lines, Apr. 28–30, 1987, Chicago, Ill.

*Primary Examiner*—Charles Hart
*Attorney, Agent, or Firm*—Joan I. Norek; Robert A. Miller; Donald G. Epple

[57] ABSTRACT

A method for detackifying oversprayed paint solids in a paint spray booth utilizes an oil-in-water emulsion as the hydrophilic fluid for capturing and detackifying oversprayed paint, which emulsion contains a certain nonionic surfactant, which surfactant greatly improves detackification performance when the paint formulation being sprayed is a low VOC formulation, and particularly a two-component formulation. The nonionic surfactant is an ethoxylated $C_{8-10}$ alkyl phenol having an HLB value of from about 4.5 to 15.5.

9 Claims, No Drawings

SURFACTANT ADDITIVE FOR HEC EMULSION

TECHNICAL FIELD OF THE INVENTION

The present invention is in the technical field of waste material management, and more particularly in the technical field of waste management for industrial paint spray booths and similar installations.

BACKGROUND OF THE INVENTION

Paint formulations that are fluid as applied are often transferred to the article being coated by a spraying technique. Various types of paint spray equipment are known and used in the industry. Such equipment includes hand-held spray guns, electrostatic spray guns, turbobells, robot arm-mounted air atomizers, and the like. The transfer efficiency, that is the percentage of sprayed material that is actually transferred to an article being coated, varies from installation to installation. Transfer efficiencies of from about 10 or 20 percent, to about 80 percent or more, are not uncommon. Thus even at a relatively high transfer efficiency, such as 70 or 80 percent, a significant amount of paint formulation is oversprayed (not transferred to the article being coated).

Such paint spraying is commonly done in an enclosed area called a paint spray booth. Paint spray booths generally are comprised of a chamber, a duct system for passing air through the chamber, a sump that contains a circulating fluid located at the bottom of the chamber, and often means for pumping a portion of the sump fluid into the chamber to form a liquid curtain. The circulating fluid is generally a hydrophilic fluid. The air passing through the chamber may carry a portion of the paint formulation to the article being coating, increasing transfer efficiency and reducing the amount of overspray. Such air stream also generally captures at least a portion of the overspray, carrying it to the hydrophilic fluid. The liquid curtain likewise generally captures at least a portion of the overspray, carrying it downward to the sump.

The paint spray booth management programs of concern to the present invention are those that employ as the hydrophilic liquid an oil-in-water emulsion. Such programs are known in the industry, and descriptions of such systems can be found in U.S. Pat. No. 4,378,235 (issued Mar. 29, 1983, inventors Cosper et al.), U.S. Pat. No. 4,563,199 (issued Jan. 7, 1987, inventors Lindenberger et al.), U.S. Pat. No. 4,750,919 (issued June 14, 1988, inventors Patzelt et al.), and U.S. Pat. No. 4,919,691 (issued Apr. 24, 1990, inventors Patzelt et al.), all of which are incorporated hereinto by reference.

Such oil-in-water emulsions are highly advantageous. The paint formulations used in paint spray booths contain some amount of volatile organic carrier ("VOC"), and some VOC can evaporate into the air during the spraying operation. The oil-in-water emulsion absorbs VOC from the air, reducing potential VOC emissions. Other constituents of the paint formulation(s) being sprayed are also received by the emulsions.

It is desirable to detackify the paint solids received by the hydrophilic fluid. It is desirable to maximize the hydrophilic fluid's loading capacity for paint solids. It is desirable to minimize the deleterious effects caused by the presence of paint solids on the movement and further processing of the hydrophilic fluid. These objects have become more challenging to achieve as industry turns from low solids solution lacquers and the like, to paint formulations containing less VOC, such as high solids enamels, base coat-clear coats, two-component urethanes, and the like. Such changes as to the type of paint formulations employed reduce VOC emissions. Such changes also increase and/or exasperate the handling and removal of oversprayed paint solids.

DISCLOSURE OF THE INVENTION

The present invention provides a method for the detackification of oversprayed paint solids in a paint spray operation wherein oversprayed paint solids come into contact with a hydrophilic fluid of the oil-in-water emulsion type. The method of the present invention comprises contacting such oversprayed paint with such an oil-in-water emulsion that contains, in addition to an oil-in-water emulsifier, from about 0.01 to about 12.0 weight percent, based on total weight of the emulsion, in fresh form, of a nonionic surfactant. Such nonionic surfactant is at least soluble in the oil phase of the emulsion, and preferably preferentially soluble in the oil, versus the water. Such nonionic surfactant generally has an HLB value of from about 4.5 to about 15.5. Preferably the ceiling on the HLB value of the nonionic surfactant is lower than 11.0, and at times it can be higher in nonpreferred embodiments. Such nonionic surfactant is an ethoxylated alkyl phenol, defined more particularly below.

PREFERRED EMBODIMENTS OF THE INVENTION

The terminology "paint formulation" refers to a composition that is fluid, containing at least one liquid phase, under the environmental conditions of a paint spraybooth, and containing a constituent or plurality of constituents capable of forming a solid film (coating) on a solid surface.

Paint formulations often include a carrier, which generally is a liquid that is a vehicle for other constituents of the paint formulation. Such other constituents may be dissolved and/or dispersed in such carrier. In the past, it was not uncommon to use lacquers that included high molecular weight polymers dissolved in solvents; such lacquers generally would be sprayed with a volume of solvent that would be five to eight times that of the coating material, and at least a portion of the solvent would be VOC. Such type of lacquers are exemplitive low solids paint formulations which use an organic solvent carrier. Paint formulations more favored by industry now are higher solids paint formulations, with less carrier, or paint formulations that may employ water as at least a significant portion of the carrier.

Paint formulations include, among other constituents, a material or plurality of materials that form the coating film. Film-forming materials generally are high molecular weight polymeric materials. As mentioned elsewhere herein, in the past some paint formulations contained pre-formed high molecular weight polymers dissolved in a solvent. Such formulations, generally referred to as solution lacquers, are low solids formulations. These are not commonly used today in industrial paint installations, but the possibility of encountering their use cannot be excluded. Some paint formulations contain polymeric material that is dispersed, instead of dissolved, in a carrier. Some paint formulations contain polymeric materials that react after application, for instance upon heating, to form higher molecular weight materials. Some formulations contain polymeric, or even oligomeric, materials that react upon application, or even during application, to form higher molecular weight materials. These paint formulations are discussed further herein. Generally, a paint formulation contains a normally solid film-forming material, or precursor(s) thereto, which are dissolved and/or dispersed in a liquid carrier.

A paint formulation may also contain pigments which provide opacity and/or color when desired. Pigments may be organic or inorganic materials, and generally are normally solid materials. Pigments may contribute also to the durability, hardness and adhesion of the ultimate coating, and contribute to the rheological properties of the paint formulation. A paint formulation may also contain additives other than pigments to effect in some way the properties of the ultimate coating and/or the characteristics of the paint formulation. Such other additives may also be normally solid materials.

When a paint formulation is transferred to the surface to be coated, generally at least a significant portion of the carrier is removed, generally by evaporation. Such evaporation is generally hastened by drying at elevated temperatures. Such temperatures should not exceed, however, that which may be detrimental to the article being coated. For instance, in the automotive field, temperatures below 177° C. are used to avoid buckling of the metal and movement of any solder.

Such limitations on drying temperatures also create limitations on the carriers and film forming constituents of paint formulations. When organic solvents are used as carriers, the choice of relatively low boiling point (and generally volatile) materials is not arbitrary but dictated by need for efficient removal of the carrier at relatively moderate elevated temperatures. The constituents that form the coating must likewise be chosen from those that properly set efficiently at temperatures that do not exceed that deemed sufficiently moderate for the article being coated. The switch from volatile organic carriers, mainly to avoid VOC emissions, has led to specialty paint formulations, which often are proprietary formulations, the compositions of which are not publically disclosed. Such formulations, being low VOC formulations (about 2 lb. VOC per gal. minimum), are generally high solids formulations, and/or use water as the carrier. (Such water-based paints contain VOC in the dispersed phase, and possibly some water-miscible VOC in the water continuous phase, and some such paints are relatively low solids formulations.)

The composition of the paint overspray (oversprayed paint) is generally that of the paint formulation being sprayed, If the paint formulation contains a relatively volatile material, such as VOC, some portion thereof may leave the paint overspray before the overspray contacts the hydrophilic fluid, and hence the paint overspray may be more concentrated than the sprayed paint formulation. In some systems there could be a degree of reaction occurring, modifying somewhat the precise composition of portion of the paint formulation that is oversprayed before it contacts the hydrophilic liquid. Nonetheless the normally solid constituents of the paint formulation, including the constituents that have the capability of forming the coating, the pigments, if any, and other additives, if any, present in the paint overspray reach the hydrophilic liquid, and are referred to herein as "paint solids", "paint overspray solids", "overspray solids", or "oversprayed paint solids".

The overspray solids of most concern to the present invention are those materials that are normally solids in the sense of being in solid state in the absence of a solvent therefor, and in the temperature environment(s) to which the hydrophilic fluid is subjected during circulation about a paint spray booth and/or processing outside of a paint spray booth. Such overspray solids include such normally solid materials which may be in solute form when within the hydrophilic fluid. The temperature environments to which the hydrophilic fluid is subjected during circulation and/or other processing range from about 15° C. to about 40° C., and more commonly from about 20° C. to about 35° C.

Such overspray solids, as sprayed, are generally very tacky materials. Without the hydrophilic fluid, which is generally circulated in such a manner that the overspray contacts it before contacting any surfaces of, and within the paint spray booth, the overspray solids would quickly cover and adhere to paint spray booth surfaces, creating waste problems wholly unacceptable for industry. Even though industrial installations generally provide hydrophilic fluid so circulated that it intercepts the overspray before the overspray reaches any surface of the paint spray booth, if the overspray solids are not sufficiently treated by the hydrophilic fluid, they may migrate to surfaces and adhere thereto, form paint pads (insoluble masses) or other deposits on the surfaces, and interfere with the movement of the hydrophilic fluid and its processing. Thus for effective waste management the overspray solids should be detackified and modified as to rheological characteristics.

The hydrophilic fluid also receives most all paint formulation constituents besides the overspray solids, including any solvents or other liquid phases thereof. The detackification and rheological property modification of the overspray solids must therefore be achieved despite the presence of such other constituents of the paint formulation(s) in the hydrophilic liquid.

The paint spray booths suitable for the process of the present invention include, without limitation, wet wall design booths, center draft design booths, and other paint spray booths wherein paint overspray comes into contact with a hydrophilic fluid. As noted above, a typical paint spray booth has a chamber into which the piece to be coated is moved and therein contacted with a paint formulation sprayed from some type of paint spray equipment. A duct and fan system generally passes air through the chamber. The air stream created thereby may be designed to improve the paint transfer efficiency. The air stream also generally assists in carrying the paint overspray, and any VOC that has escaped from the sprayed paint formulation, into contact with the hydrophilic fluid. The duct system also generally includes an exhaust system which collects and exhausts the air, generally after such portion of the air has contacted the hydrophilic fluid. The paint spray booth generally is provided with a sump at the bottom or other means for collecting the hydrophilic fluid. The hydrophilic fluid is generally pumped onto a means for forming a liquid curtain; and the hydrophilic fluid of the liquid curtain falls through the booth downward and returns to the sump. The hydrophilic fluid thus generally recirculates through the paint spray booth. Paint spray booths of these types operate, in a sense, as large gas scrubbers, collecting the paint overspray, and generally VOC that has escaped from the paint formulation sprayed.

The hydrophilic fluid is generally collected, or removed from the paint spray booth, on either a periodic or continuous basis. When the hydrophilic fluid is an oil-in-water emulsion that can be broken under practical conditions, there is provided a highly advantageous method of recovering at least some components thereof. Emulsion breaking techniques include both physical and chemical breaking methods. One highly advantageous method known for oil-in-water emulsions used in paint spray booths employs certain surfactants, or emulsifiers, which are discussed below, in the making of the oil-in-water emulsion, which surfactants permit the spent emulsion to be broken by a pH adjustment.

As described in the patents noted above, generally the emulsion is adjusted in pH from a pH range of about 7.5 to about 10.0, and possibly as high as 11.0, downward to a pH value of 6.5 or less, and most commonly to a pH value within the range of from about 3.0 to about 6.5. Upon emulsion breaking, the components thereof separate into at least an oil phase and an aqueous phase. The overspray solids may be at least partially removed from the emulsion before breaking. When present at least to some extent in the emulsion at the time it is broken, it separates from the other components generally into a separate sludge phase. Such sludge phase or layer may contain, in addition to the overspray solids, some of the organic liquid(s) of the emulsion, some water, and some VOC, the organic liquid(s) generally being the continuous component of the sludge layer.

It is generally highly desirable to recover the organic liquid(s), surfactants, and at times even the water, of the emulsion after breaking for reforming the oil-in-water emulsion for reuse in the process. The recycling of such emulsion components reduces the costs of the waste management program, and reduces the waste materials generated by paint spray installations. Such emulsion recovery depends on achieving, within a reasonable time period, a substantially clean break, whereby the phases or layers resultant from such break are relatively free of waste material(s) or can be made so by simple processing.

As noted above, the overspray solids may be at least partially removed from spent emulsion before emulsion breaking. Various means for sludge removal are known and industrially used, including gravity filtration, vacuum assisted filtration, air flotation, skimming (particularly practical for overspray solids which tend to float in the emulsion), air-assisted flotation with skimmer, manual removal, removal from bottom levels (generally employed for overspray solids which tend to sink), rotostrainer removal and dispersion. The last mentioned method, dispersion, does not generally remove the solids from the emulsion itself but instead may minimize the hindrance effects caused by the presence of paint overspray solids in the emulsion, permitting the emulsion to be moved and processed without undue difficulties despite the presence of such solids.

As to overspray solids present in the emulsion at the time it is broken, a relatively clean break will permit the removal of such solids from the oil and aqueous phases by skimming, manual removal, and the like methods. While such solids layer generally contains some amount of the organic liquid(s) and water, the amounts of such materials preferably should be sufficiently low so that they do not interfere with the use of such sludge as an auxiliary fuel or other purpose or other disposal. Moreover, the amount of organic liquid(s) and/or water in such sludge layer should preferably not constitute a significant loss to these potential recyclables.

When VOC is present in the paint formulation sprayed, VOC will be captured by the emulsion. It may be recovered from the emulsion, or from one or more phases (generally the organic liquid phase) of a broken emulsion, by known techniques, such as by distillation, stream stripping, or the like.

To be suitable for recycle, the various emulsion components need to be relatively free from waste material, which are here the various constituents of paint formulations. The presence of such waste materials in a newly prepared emulsion will reduce such emulsion's capacity for receiving and handling more overspray. Thus while it is not necessary to completely eliminate waste materials from the recovered emulsion components that are to be used to prepare fresh emulsion, the presence of significant amounts of such waste materials will of course lead to early exhaustion of the new emulsion, and hence not be practical. Further, it is not necessary to isolate from one another each component of the emulsion beyond the separation of phases generally required for waste material separation.

It is generally desirable to reduce the concentration levels of overspray solids, VOC, and paint formulation liquid phases (that are foreign to fresh emulsions) in any materials which are recovered from a broken emulsion to concentration levels of about 2 wt. percent, or less, based on total weight of the organic phase, that is, the hydrocarbon liquid and/or polar solvent, and components dissolved therein, described further below.

The process of the present invention employs an oil-in-water emulsion, which in fresh form is comprised of:

(a) from about 5 to about 50 weight percent of an oil;

(b) from about 0.5 to about 20 parts by weight of an oil-in-water emulsifier per 100 parts by weight of such oil;

(c) from about 0.01 to about 12.0 weight percent of a certain nonionic surfactant; and (d) the balance being substantially water, wherein the oil is a liquid that is comprised of:

(i) from 0 to about 100 parts by weight of an organic hydrocarbonaceous liquid ("hydrocarbon liquid") per hundred parts by weight of total oil; and (ii) from about 0 to about 100 parts by weight of a certain type of polar organic solvent ("polar solvent") per hundred parts by weight of total oil.

When the levels of emulsion components are expressed in terms of weight percents, such weight percentages are based on the total weight of the entire emulsion.

Typical materials which can be employed include Telura 323 (Telura is a registered trademark), a process oil manufactured by Exxon Company, U.S.A., which is characterized as having a boiling point of from 545° F. to 884° F., negligible solubility in water, a specific gravity of 0.903 at 60° F., a Cleveland open cup flash point of 330° F. and a viscosity at 100° F. of 105 to 115 SUS. This oil is believed to be a complex mixture of aliphatic and aromatic petroleum hydrocarbons. Also useful are various chlorinated paraffinic materials such as those designated Kloro 6000, Kloro 7000, CW 52, CW 170, CW 8560, from the Keil Chemical Division of the Ferro Corporation; as well as Isopar M, a branched paraffinic material available from the Humble Oil & Refinery Company; LOPS, a low odor paraffinic solvent purchased from the Exxon Company, U.S.A.; and Marcol 82, a highly aliphatic viscous white oil available from Exxon Company, U.S.A.

THE HYDROCARBON LIQUID

The hydrocarbon liquid component of the oil-in-water emulsion of this invention is a non-volatile, water-immiscible, hydrocarbon material which optionally may act as a solvent for volatile organic paint carrier and any other constituents of the paint formulation being used in a paint spray booth. The hydrocarbon liquid is not VOC, as that term is defined herein in terms of vapor pressure. Hydrocarbon liquids employed may be primarily aliphatic, paraffinic, aromatic or mixtures thereof. The hydrocarbon liquid may be either halogenated or non-halogenated, and should generally have a boiling point greater than 150° F., and preferably 200° F., and most preferably above 300° F. Viscosities of materials used may range from that of a 100 SEC primarily aliphatic petroleum process oil to that of a highly chlorinated paraffinic material having a viscosity in excess of 20,000 cps. Thus, the only criteria for materials of this type are those stated above.

For safety purposes, the hydrocarbon liquid employed in the oil-in-water emulsion of this invention should be substantially non-toxic and have a flash point greater than 250° F. A preferred hydrocarbon liquid for use in this invention is Telura 323 (Telura is a registered trademark of the Exxon Company, U.S.A.) described above.

It will be seen, however, that substantial variations in hydrocarbon liquids can be accomplished without varying from the spirit and intent of this invention. As an example, 10 weight motor oil may be satisfactorily employed as the oil phase of the oil-in-water emulsion.

THE OIL-IN-WATER EMULSIFIERS

The useful oil-in-water emulsifiers are those capable of forming a relatively stable oil-in-water emulsion with the organic liquid selected. Generally these materials will have an HLB value ranging from about 6 to about 40, and most preferably from about 10 to about 30. The HLB system is defined in the Atlas HLB Surfactant Selector. Since the oil-in-water emulsions of this invention preferably can be broken, ease of breakability is an important criteria. The emulsifier may be any water-soluble anionic, cationic, nonionic, or mixture of emulsifiers falling within the above criteria. Useful emulsifiers preferred for use in this invention are saturated and unsaturated fatty acids and alkali metal salts thereof containing 12 to 30, and preferably 16 to 24, carbon atoms. Other oil-in-water emulsifiers such as the condensation product of cocoamine reacted with 2 moles of ethylene oxide may be used.

The preferred emulsifiers of the present invention form emulsions which break when made acidic, which permits efficient recovery of the emulsion components. It is expected, however, that oil-in-water emulsifiers other than these preferred emulsifiers and other oil-in-water emulsifiers specifically mentioned herein may be employed. A particularly preferred emulsifier, of the fatty acid type which form emulsions which break when made acidic, is oleic acid and its alkali metal salts and mixtures thereof, the presence of salt forms being dependent on pH environment of course when in aqueous solution.

The polar solvent of the present invention is a polar organic material that is liquid at temperatures within a range of about 5° C. to about 45° C., has a solubility in water of less than 10 weight percent (based on the total weight of the solution), has a vapor pressure of less than about 0.5 Torr at 20° C., a Tag closed cup flash point of at least 90° C., and which can be easily admixed with the hydrocarbon liquid component of the emulsion to form a single-phase, fully miscible solution of polar solvent and hydrocarbon liquid, in the portions used in the oil-in-water emulsion. In preferred embodiment, the polar solvent has a Tag closed cup flash point of at least 94° C.

The polar organic solvent is preferably a dialkyl diester of a dibasic acid, or mixtures thereof, having the structure:

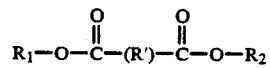

wherein, in the above structural formula, $R_1$ and $R_2$ are independently linear or branched groups containing separately from 1 to about 6 carbon atoms, and preferably containing from 1 to about 4 carbon atoms, and more preferably chosen independently from methyl, ethyl, propyl and isopropyl alkyl groups, and wherein $R'$ is a linear or branched alkylene group containing from about 2 to about 12 carbon atoms, and preferably containing from about 2 to about 8 carbon atoms, and more preferably containing from about 2 to about 6 carbon atoms. In other preferred embodiment, $R'$ is primarily linear methylene repeating units containing from about 2 to about 8 carbon atoms.

Such dialkyl diesters of a dibasic acid, also known in the industrial chemical field as dibasic esters or DBE, are particularly exemplified by dimethyl adipate, dimethyl glutarate, dimethyl succinate, and mixtures thereof, which materials are commercially available from the DuPont de Nemours Company. Such materials are described in a brochure from that company entitled "DuPont Dibasic Esters (DBE), Solvents and Intermediates For Industry", which brochure is incorporated hereinto by reference. The commercially available forms of such enumerated DBE's include compositions of various purities and admixtures in various concentrations, ranging from about 15 to about 90 weight percent dimethyl adipate, from about 10 to about 99 weight percent dimethyl glutarates, and from about 0.5 to about 99 weight percent dimethyl succinate, and various admixtures thereof. An admixture that is well suited for use in the emulsion of the present invention is one that contains from about 15 to about 20 weight percent dimethyl adipate, from about 60 to about 70 weight percent dimethyl glutarate, and from about 15 to about 20 weight percent dimethyl succinate.

Each of the dimethyl adipate, dimethyl glutarate and dimethyl succinate diesters have a vapor pressure at 20° C. of from about 0.06 to about 0.3 Torr. These materials are soluble in water to the extent of from about 4 to about 7.5 weight percent, and the Tag closed cup flash point for each of these materials or admixtures thereof ranges from about 94° C. to about 107° C.

The above discussed dialkyl diesters of dibasic acids, which are referred to herein generally as DBE or DBE's, are within the structure set forth above, wherein both of $R_1$ and $R_2$ are methyl. Another type of dialkyl diester of a dibasic acid which is very useful as a component of the present invention are those in which a substantial portion of $R_1$ and $R_2$ are isobutyl alkyl groups, and these types of dialkyl diesters of dibasic acids are referred to herein as DIB or DIB's. Such DIB's which are readily commercially available are generally blends, such as the blend available from the DuPont Company under the tradename of "DIB-DBE".

In preferred embodiment, the polar solvent comprises from about 10 to about 50 weight percent of the oil component of the emulsion, the balance of the oil component being the hydrocarbon liquid, which is described above. In more preferred embodiment, the polar solvent comprises from about 10 to about 35 weight percent of the oil component of the emulsion, the balance of the oil component being the hydrocarbon liquid.

In a preferred embodiment, the oil-in-water emulsion contains from about 15 to about 40 weight percent of the oil component, and more preferably such oil component contains from about 10 to about 35 parts by weight of DBE, DIB, or mixtures of DBE and DIB, per 100 parts by weight of the oil component, the balance of the oil component preferably being a 100 second primarily aliphatic process oil. In these preferred embodiments, the preferred oil-in-water emulsifier is substantially oleic acid, which will be in a water-soluble salt form when the emulsion has a pH value within the range of from about 7.5 to about 10.0, or 11.0.

The pH sensitivity of the oil-in-water emulsion which is used in the present process, as it relates to the breaking of such emulsion, and to the reforming of the emulsion using in part recovered materials, are similar to the pH sensitivities of emulsions disclosed in the above-noted U.S. patents. The use of an oil, as an emulsion component, which is a combination of a hydrocarbon liquid and a polar solvent, for the emulsion of the present invention, is similar to the oil component disclosed in particular in U.S. Pat. No. 4,919,691, which is noted above. The present invention, which employs in its process an oil-in-water emulsion that further contains a certain nonionic surfactant, has surprising advantages over processes using such other oil-in-water emulsions, as is demonstrated herein.

As noted elsewhere herein, low VOC paint formulations are becoming more and more favored by the industry. Such low VOC paint formulations, regardless of whether the VOC is reduced by increasing the solids content or by the use of a non-VOC carrier, such as water, generally have higher solids contents than the paint formulations used by industry in the past. For a given rate of spraying a paint formulation and a given transfer efficiency, a higher solids paint formulation will create a greater amount of overspray solids. When one attempts to maintain an emulsion retention time in the paint spray booth that is at least somewhat commensurate with previous practice, the emulsion often becomes overloaded, and unable to sufficiently detackify and rheologically modify such overspray solids. Decreasing the emulsion retention time is costly, not only in terms of material costs, but also as to servicing. In addition, any significant decrease in emulsion retention time can lead to interference with the entire coating operation.

The problems encountered in waste management programs when low VOC formulations are being sprayed is further believed to be more complicated than just a higher overspray solids loading of an emulsion for a given emulsion retention time. The rate of overspray solids is generally also increased, and such rate increase is believed to impact on an emulsion's response to the overspray solids and capability of sufficiently taking in such solids and modifying the rheological properties thereof. In addition, the switch to low VOC paint formulations was not merely a matter of decreasing the VOC. The type of paint solids incorporated into the low VOC paint formulations were generally also changed.

In the automotive and appliance industries, for instance, in the past a typical coating system was comprised of a primer, then possibly a sealer, which were then followed by a topcoat. The primer used was often a solvent-borne primer-surfacer pigmented close to the critical pigment volume, preceded by a thin film of flash primer. A sealer, when used, was typically a copolymer that adhered to the undercoat, and to which the topcoat adhered. The topcoat generally was a low solids solution lacquer, which would have a high VOC content.

To reduce VOC emissions, the primer/topcoat technology, particularly that using a low solids solution lacquer topcoat formulation, has been displaced to a great extent. The first displacement was to the use of higher solids dispersion lacquers, enamels and urethanes, all of which may still be encountered in some industrial paint installations. The most frequently encountered paint formulations in automotive systems are those that have low VOC content, one version thereof being referred to generally as base coat/clear coat systems. Since high molecular weight polymeric materials remain the desired film-forming component(s) of the coating, in order to substantially reduce VOC from the paint formulation, it is necessary to either employ low molecular weight precursors to such polymeric materials, or use water as a substantial portion of the continuous carrier phase.

The use of lower molecular weight materials with a cross-linking agent, for instance melamine, to increase the molecular weight of the film-forming material was a well known practice in the past. Such former systems relied generally upon baking the coating under elevated temperature conditions to cure them, causing the cross-linking action to the desired extent. As noted above, even metallic articles have temperature ceilings; plastic articles are even more sensitive to elevated temperatures. In addition, the lower the molecular weight of the precursor to the ultimate polymer, the more extensive is the post-application reaction that is required. Thus the paint formulations in great favor now are those that combine very reactive precursors or include a catalyst for the desired reaction, which reduce the reliance on elevated temperature baking to effectuate the desired formation of the high molecular weight polymeric film-forming material. Some of such paint formulations are so reactive at ambient room temperature that components thereof are kept isolated until just prior to spraying. Such paint formulations are often referred to as "two component" systems, in the sense that two compositions or formulations are combined only just before spraying.

Such two component systems can be so reactive that reaction is occurring from about the moment the compositions are mixed. Reaction is therein occurring before the paint formulation reaches the article being coated. For the overspray, reaction is occurring before the overspray comes into contact with the hydrophilic fluid, and may well continue after the overspray is received by the hydrophilic fluid.

Paint formulations that contain substantially aqueous carriers may also have reactive components, even though fairly high molecular weight materials may be conveniently dispersed in the aqueous phase. For instance, the polymeric material may be synthesized in the first instance as an emulsion polymer, preferably using low levels of emulsifier. Then other materials would be added to provide a suitable paint formulation.

Such low VOC paint formulations have been found to be difficult to disperse and solubilize in the standard oil-in-water emulsions, even when a polar solvent was included, such as DBE and/or DIB. While the inclusion of the polar solvent improves the performance of the emulsion in handling the low VOC paint formulations, the present day low VOC paint formulations require an even further enhancement of the emulsion.

It has been surprisingly found that the inclusion of a certain nonionic surfactant permits a higher solids loading in the emulsion and provides extremely advantageous rheological properties. The concentration of paint solids that is retained in the bulk of an emulsion, generally in the oil phase thereof, can be as much as two or three times higher in comparison to the same emulsion (and same paint formulation being sprayed) that does not have the nonionic surfactant. This greater solubilization and/or dispersion has been found for the overspray from automotive prime, topcoat and clearcoats of the low VOC type.

Paint overspray solids not only generally become solubilized or fluidized in the bulk emulsion, but also form, to some degree, a separate paint solids phase or phases. Such paint solids can float, sink or disperse in the emulsion. Of concern to the management program are the rheological characteristics of the floating and sinking paint solids. It has been surprisingly found that the inclusion of the nonionic surfactant in the emulsion greatly improves the characteristics of such floating and sinking paint solids, in comparison to an emulsion without the nonionic surfactant. These paint solids are less cohesive, less elastic, and more fluid, which are all desirable characteristics. These solids tend to disperse or to sink, although floating solids may not be eliminated wholly. These paint solids flow better, and are easier to pump and vacuum, than paint solids in emulsions that do not include the nonionic surfactant.

Prior to the present invention, it was noted during an industrial use of an oil-in-water emulsion with DBE as the polar solvent in an automotive paint spray booth that problems with settled paint solids were being encountered. The paint solids were cohesive, slimy and difficult to pump. Laboratory tests determined that these settled paint solids were not soluble in either the oil or the water phase of the emulsion, despite the inclusion of the DBE, or the inclusion of a combination of DIB and DBE.

Laboratory tests, in more particular the "Paint Overspray Management Test" described below, determined that the inclusion of the nonionic surfactant alleviated the problems encountered in the field, and the laboratory test results have been confirmed by further testing in industrial automotive paint spray booths.

The failure of former oil-in-water emulsions, even those including DBE and/or DIB-DBE, to sufficiently solubilize the paint solids in industrial installations using low VOC paint formulations supports the belief that the problems are created by the nature of the paint solids in such formulations, more so than the concentration of solids in the paint formulations. As set forth in U.S. Pat. No. 4,919,691, which has an April, 1989, filing date, the oil-in-water emulsion, when enhanced by the inclusion of the polar solvent, was demonstrated to well handle the paint overspray being encountered in industry at that time. That emulsion could be loaded to up to 9 volume percent, even with two component clear coat formulations, and still bring about good paint detackification and still maintain a viscosity, as measured in a Zahn No. 3 cup, ranging between about 10 to 12 seconds. The passage of a year or two in the industrial paint spray industry has provided paint formulations with increasingly challenging solids natures.

In preferred embodiment, the process of the present invention is directed to the detackification of oversprayed paint solids from paint formulations that are of the low VOC type. In more preferred embodiment, the present invention is directed to the detackification of oversprayed paint solids from paint formulations of the two-component type. The present process has been found to have great advantages, such as higher paint loadings and improved detackification and rheological characteristics, when employed in the detackification of low VOC paint formulation overspray, and particularly two-component formulation overspray, which advantageous characteristics are vast improvements over oil-in-water emulsion programs known before when used for such type of overspray.

The nonionic surfactant component of the oil-in-water emulsion used in the process of the present invention, further, is believed to provide the advantageous features of the invention, particularly the improved dispersibility and solubility of the overspray solids, by acting as a wetting agent for the system, providing more effective penetration of the oil/water interface by the overspray solids. The nonionic surfactant component of the emulsion is not included in the emulsion as a coemulsifier or emulsion stabilizer. The oil-in-water emulsion, as described herein but without the nonionic surfactant component, requires no coemulsifier or emulsion stabilizer, being appropriately stable in a process such as that of the present invention without any nonionic surfactant of the type defined herein as the nonionic surfactant component of the emulsion.

As noted above, the nonionic surfactant useful in the present invention is an ethoxylated alkyl phenol which is at least soluble in the oil phase of the emulsion, and preferably is preferentially soluble in the oil phase, versus the water phase. In more detail, the alkyl substituent of such ethoxylated alkyl phenol is an alkyl having from about 8 to about 10 carbon atoms. Such nonionic surfactant preferably has an HLB value of from about 4.5 to about 11.0, and more preferably the ceiling on the HLB value is lower than 11.0.

A surfactant, or surface active agent, generally is an organic compound whose molecules contain a hydrophilic group(s) and a lipophilic group(s), providing the surfactant with a degree of affinity to both water and oil. In an emulsion (a colloidal dispersion of one liquid in another) surfactants will migrate to the water/oil interface of the dispersed droplets. The HLB value of a surfactant is a measure of the balance between such hydrophilic and lipophilic groups. For the ethoxylated alkyl phenol nonionic surfactant of the present invention, for a given alkyl substituent, the degree of ethoxylation will determine the HLB.

A nonionic surfactant with an HLB below about 4.5 would be soluble in the oil of the emulsion of the present invention, and certainly would be substantially insoluble in the water phase, but it is believed that such a low HLB surfactant would not provide the high loading of overspray solids, which is an extremely advantageous feature of the present emulsion. Further, while a nonionic surfactant with an HLB value in excess of 11, for instance an ethoxylated nonyl phenol with a higher degree of ethoxylation then referred for the present invention, may provide high solids loading capability to the present emulsion, such a surfactant has a relatively high affinity for water and has been found to interfere with the breaking of the emulsion when spent. If the emulsion cannot be efficiently broken into separate aqueous and oil phases, its use creates problems in a waste management program.

Therefore while the process of the present invention may be employed to increase paint solids loading of the emulsion using nonionic surfactants with HLB values in excess of 11, for instance up to about 15.5, such higher HLB nonionic surfactant uses would not constitute preferred uses.

Ethoxylated $C_{8-10}$ alkyl phenols having HLB values within the range of from about 4.5 to about 15.5 are readily commercially available. A list of some of such nonionic surfactants together with their HLB values and commercial tradenames are set forth below in Table 1. This list is merely representative, and not exhaustive. Table 1 also includes a higher HLB surfactant useful in nonpreferred embodiments of the invention.

TABLE 1

| HLB | Surfactant | Tradename |
|---|---|---|
| 4.6 | Nonoxynol-1.5 | Igepal CO-210 |
| 7.8 | Ethoxylated octyl phenol | Peganol OP 6 |
| 8.8 | Nonoxynol-4 | Igepal CO-430 |
| 10.8 | Nonoxynol-6 | Igepal CO-530 |
| 14.2 | Nonoxynol-12 | Igepal CO-720 |
| 15.0 | Nonoxynol-15 | Igepal CO-730 |

Igepal is a tradename of the GAF Corporation; Peganol is a tradename of the Borg-Warner Chem. Inc. The term "nonoxynol-" is an abbreviated term for an ethylene oxide adduct of nonyl phenol, the number following the dash identifying the moles of ethylene oxide per mole of nonyl phenol. The sources of the HLB values, surfactant identifications, and commercial sources of such surfactants set forth in Table 1 are "McCutcheon's Emulsifiers & Detergents", 1986 North American Edition, McPublishing Co., Glen Rock, New Jersey, and "The Condensed Encyclopedia of Surfactants", Michael and Irene Ash (compilers), 1989, Chemical Publishing Co. Inc., which sources may contain further information concerning these and other ethoxylated alkyl phenol surfactants useful for the present invention, and which references are incorporated hereinto be reference.

In preferred embodiment, the oil-in-water emulsion used in the process of the present invention contains from about 0.1 to about 4.0 weight percent of the nonionic surfactant.

The emulsions employed in the process of the present invention are generally formed by simply admixing the ingredients together, and in preferred embodiment the water, oil and oil-in-water emulsifier are admixed to form an oil-in-water emulsion prior to the addition of the nonionic surfactant with some agitation, or continued agitation. When using a fatty acid as the oil-in-water emulsifier, pH values of from about 7.5 to about 10, and preferably from about 7.5 to about 9.5 are used. Due to the potential hydrolysis of dibasic esters, such as DBE and DIB, when they are included in the oil as the polar solvent it is advisable to maintain the pH of the emulsion below about 9.5, and preferably below about 9.0. Similarly, when breaking an emulsion in which dibasic esters are included as the polar solvent, the pH preferably should be between about 3 to about 6.5, and more preferably between about 4.0, or 5.0, and about 6.5. Operating with minimal pH swings can improve the recovery of dibasic esters by avoiding the hydrolysis of these materials, either at high or low pH values.

The oil-in-water emulsion, as used in the process of the present invention, has of course a finite retention time in the recirculating system of a paint spray booth. The emulsion, or portions thereof, are periodically removed from the paint spray booth system, either on a batch, semicontinuous or continuous basis. The spent emulsion is then typically pumped to the site at which the emulsion breaking and material recovery will occur. If there are deficiencies in the emulsion's paint detackification, dispersal and/or rheological modification performances, such deficiencies will be evident from the handling problems encountered in pumping the spent emulsion from the paint spray booth system and from the deposits of paint solids in less than fully detackified condition in the system.

In preferred embodiment, the emulsion used in the process of the present invention is thus collected from the paint spray booth circulating system, broken by adjusting the pH downward, as discussed above, and from the separate aqueous, oil and paint solids phases of such broken emulsion the paint solids are substantially removed. In more preferred embodiments, from such broken emulsion at least a portion of the hydrocarbon liquid, polar solvent, oil-in-water emulsifier, and/or nonionic surfactant are recovered for use in remaking fresh emulsion. In some embodiments, at least a portion of the water is recovered from such broken emulsion and reused in making fresh emulsion. The aqueous phase of the broken emulsion, regardless of whether it is being recovered for reuse or not, may be subjected to further water clarification techniques, such as coagulation, flocculation and the like.

The various components of the emulsion are deemed sufficiently recovered for reuse in making fresh emulsion even though not isolated. For instance, the polar solvent, hydrocarbon liquid, oil-in-water emulsifier and nonionic surfactant may be recovered together as a single phase, that is the oil phase with the emulsifier and surfactant dissolved therein.

As noted elsewhere herein, the use of nonionic surfactants that have HLB values in excess of 11.0 will have deleterious effects on the recycling of emulsion components, and nonionic surfactants that have HLB values in excess of about 8.8 or 9.0 can also have some undesirable effects. The aqueous phase of a broken emulsion should preferably be clear or transparent; haziness or cloudiness is indicative of the presence of some nonionic surfactant and/or oil (hydrocarbon liquid and/or polar solvent) in the water. A clean break between the aqueous phase and the oil phase (including emulsifier and surfactant) instead is desired. The cloudiness of such aqueous phase (also known as "acid-break water") of course increases in degree with increasing levels of surfactant and/or oil dispersed therein. The interference with a clean break increases with the increase in HLB value of the nonionic surfactant employed.

The water used to form the oil-in-water emulsion, whether fresh or recovered (recycled) water, should preferably contain no more than about 150 ppm hardness as $Ca^{+2}$ or $Mg^{+2}$, particularly when the oil-in-water emulsifier is of the fatty acid type. If the water contains excessive hardness, undesirable precipitates may form in the emulsion. If hard water is encountered, however, the addition of chelating agents may avoid any undesirable precipitates. Suitable chelating agents include ethylenediaminetetraacetic acid (EDTA), nitrilotriacetic acid (NTA) and the like, and such chelating agents are preferably added to the water on a 1:1 molar basis with the hardness therein.

As to VOC present in the paint formulation sprayed, such VOC typically is one or more of various aromatic materials, such as benzene, xylene, toluene, or low-boiling nonaromatic materials such as ethers, esters, alcohols, ketones, such as methyl isobutyl ketone, methyl amyl ketone, and the like kind of organic materials. The oil-in-water emulsion employed in the process of the present invention generally will act as a solvent for these types of volatile organic carriers, whereby the VOC within the paint overspray, or within the air, will be absorbed by the emulsion.

VOC is presently defined in the industry, and herein, as an organic compound having a vapor pressure greater than 0.1 mm of Hg at standard temperature and pressure and no component of a wholly fresh emulsion is a VOC by such definition.

Any values stated herein that are temperature dependent are values as determined at 25° C., unless expressly indicated otherwise.

By "soluble" is meant herein, unless expressly indicated otherwise, that a given "solute", when admixed with a given "solvent", forms a transparent solute/solvent system at all concentrations of such solute contemplated herein for such solute.

Any values stated herein that are pressure dependent are values as determined at about average atmospheric pressure (about 14.7 lbs. per square inch).

PAINT OVERSPRAY MANAGEMENT TEST

The procedure used for determining an emulsion's performance in managing a loading of paint overspray on a laboratory scale is as follows. A blender is used to provide controlled agitation. More specifically, the blender is an Osterizer blender having a vessel with a capacity of about 1,250 ml. and a rotary mixing means. 140 mls. of water are charged to the blender, followed by three drops of caustic (50 percent NaOH in water) Agitation is commenced at the low speed setting, and then 60 mls. of the oil is added, with the oil-in-water emulsifier contained therein. When a nonionic surfactant is included in the emulsion, it is added after the oil, while the agitation at low speed setting continues. The agitation is then increased by switching the speed setting to high, for a thirty second time period, after which the blender setting is returned to low and the admixture's pH is measured and adjusted to a value within the range of from 8.2 to 8.6 using the caustic or sulfuric acid (10% $H_2SO_4$ in water). A paint formulation is then added to the emulsion that has been formed in the blender. The amount of the paint formulation added may be varied from one test to another, but is generally within the range of from 10 to 40 mls. The emulsion and the charge of paint formulation are then mixed, at high speed, for one minute, at which time the blender is turned off and the blender contents are transferred to an 8 oz jar, which is then capped. The emulsion/paint formulation admixture is then observed visually to determine if the solids sink, float or disperse, and to note the properties of the floating or sinking solids. One hour after the emulsion and paint formulation were admixed, an aliquot of the admixture, from the bulk phase thereof is taken and the oil/water/ solids concentrations thereof are determined. The various additions are made in the procedure using standard syringes and graduated cylinders.

The oil/water/solids contents of the loaded emulsion are determined from the above noted sample of the bulk phase as follows. The bulk phase sample taken is generally an 8 to 12 oz. sample taken from an area of the bulk phase that will yield a good representative sample. It is then mixed thoroughly to avoid any phase separation, and a 45 ml. aliquot thereof is then transferred to a 50 ml. graduated centrifuge tube. 5 ml. of the sulfuric acid are charged to such tube, which is then capped and shaken thoroughly to completely mix the sulfuric acid with the sample. The acidified sample is then centrifuged (standard laboratory centrifuge with a four place rotor) at full speed for 10 minutes, after which the volumes of the separated oil and water phases are determined from the volumetric calibrations on the side of the centrifuge tube. The percentages of the oil phase and the water phase are calculated by dividing the volumes of each by 0.45. The percentage of the solids is determined by subtracting the percentages of water and oil from 100.

EXAMPLES 1 TO 15 AND COMPARATIVE EXAMPLES A TO J

The Paint Overspray Management Test described above was used to determine at least the percentage of paint solids in the bulk phase of a number of emulsions. In Examples 1 to 15, each of the oil-in-water emulsions included a nonionic surfactant, and all, except Example 1, also included a polar solvent. In the Comparative Examples, no nonionic surfactant was included in the emulsion, but a polar solvent was included except in Comparative Example a. The oil, which as described above was 60 ml. in each instance, was one of three compositions. The oil designated A was comprised of 93 wt. percent 100 second oil and 7 wt. percent oleic acid. The oils that are designated B and C contain 80 vol. percent of the 93/7 100 second oil/ oleic acid combination, and 20 volume percent of respectively DBE and DIB. In Table 2 below, such oils are denoted both by these letter designations plus by reference to the DBE or DIB polar solvent. The nonionic surfactants used in Examples 1 to 15 are identified in Table 2 below generically, although each was a commercial product. The paint formulations used in these Examples and Comparative Examples are all commercial paint formulations used in the automotive field. They are all low VOC formulations; the formulation designated in Table 2 as "Prime-4" is a two-component formulation. The paint formulations otherwise are identified by the application type, followed by a numerical designation, to distinguish for instance one prime formulation from the other prime formulations. The paint formulation compositions are generally proprietary information. The nonionic surfactants were charged in Examples 1 to 15 in the amount of about 2 weight percent, based on total weight of the emulsion. The amount of paint formulation used in these Examples varied from about 22 to about 27 mls., but for a given paint formulation the same charge of paint formulation was used for each Example and Comparative Example.

The test results are reported in Table 2 in terms of percent solids, as determined in accordance with the Paint Overspray Management Test described above. The identifications of the Examples and Comparative Examples are set forth on Table 2 in column designated "No." thereof.

TABLE 2

| No. | Paint Type | Oil | Polar Solvent | Surfactant | Percent Solids |
|---|---|---|---|---|---|
| a | Topcoat-1 | A | none | none | 2 |
| 1 | Topcoat-1 | A | none | Nonoxynol-4 | 5 |
| b | Topcoat-1 | B | DBE | none | 7 |
| 2 | Topcoat-1 | B | DBE | Nonoxynol-4 | 11 |
| c | Topcoat-2 | C | DIB | none | 5 |
| 3 | Topcoat-2 | C | DIB | Nonoxynol-12 | 12 |
| d | Prime-1 | C | DIB | none | 11 |
| 4 | Prime-1 | C | DIB | Nonoxynol-12 | 14 |
| e | Prime-2 | C | DIB | none | 4 |
| 5 | Prime-2 | C | DIB | Nonoxynol-12 | 10 |
| f | Topcoat-3 | C | DIB | none | 4 |
| 6 | Topcoat-3 | C | DIB | Nonoxynol-12 | 14 |
| g | Prime-3 | C | DIB | none | 11 |
| 7 | Prime-3 | C | DIB | Nonoxynol-12 | 14 |
| h | Topcoat-4 | C | DIB | none | 5 |
| 8 | Topcoat-4 | C | DIB | Nonoxynol-12 | 12 |
| i | Prime-4 | C | DIB | none | 2 |
| 9 | Prime-4 | C | DIB | Nonoxynol-8 | 5 |
| 10 | Prime-4 | C | DIB | Nonoxynol-12 | 8 |
| 11 | Prime-4 | C | DIB | Nonoxynol-15 | 6 |
| j | Prime-5 | C | DIB | none | 2 |
| 12 | Prime-5 | C | DIB | Nonoxynol-4 | 5 |
| 13 | Prime-5 | C | DIB | Nonoxynol-8 | 8 |
| 14 | Prime-5 | C | DIB | Nonoxynol-12 | 7 |
| 15 | Prime-5 | C | DIB | Nonoxynol-15 | 13 |

COMMERCIAL APPLICABILITY OF THE INVENTION

The present invention is applicable to the coatings industries and the waste management industries, particularly those related to paint spray booth installations.

We claim:

1. A method for the detackification of oversprayed paint solids in a paint spray operation wherein said oversprayed paint solids come into contact with an oil-in-water emulsion employed for paint detackification purposes, comprising:
    contacting said oversprayed paint solids with said oil-in-water emulsion wherein said oil-in-water emulsion is comprised of
    from about 5 to about 50 weight percent of an oil,
    from about 0.5 to about 20 parts by weight of an oil-in-water emulsifier per 100 parts by weight of said oil,
    from about 0.01 to about 12.0 weight percent of a nonionic surfactant,
    and the balance of said oil-in-water emulsion being substantially water,
    wherein said oil is a liquid comprised of from 0 to about 100 parts by weight of an organic hydrocarbonaceous liquid per hundred parts by weight of said oil, and from about 0 to about 100 parts by weight of a polar organic solvent per hundred parts by weight of said oil,
    and wherein said nonionic surfactant is an ethoxylated alkyl phenol, wherein said alkyl contains from about 8 to about 10 carbon atoms, and has an HLB value of from about 4.5 to about 15.5.

2. The method of claim 1 wherein said nonionic surfactant has an HLB value of from about 4.5 to about 11.0.

3. The method of claim 1 wherein said nonionic surfactant has an HLB value of from about 4.5 to about 9.0.

4. The method of claim 1 wherein said nonionic surfactant is present in said oil-in-water emulsion in the amount of from about 0.1 to about 4.0 weight percent, based on total weight of the emulsion.

5. The method of claim 1 wherein said oil-in-water emulsifier is saturated and/or unsaturated fatty acid containing from about 12 to about 30 carbon atoms, and alkali metal salts thereof.

6. The method of claim 1 wherein said polar organic solvent is a dialkyl diester of a dibasic acid, or mixtures thereof, having the structure

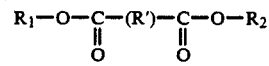

wherein $R_1$ and $R_2$ are independently linear or branched groups containing separately from 1 to about 6 carbon atoms, and wherein $R'$ is a linear or branched alkylene group containing from about 2 to about 12 carbon atoms.

7. The method of claim 6 wherein $R_1$ and $R_2$ are independently linear or branched groups containing separately from 1 to about 4 carbon atoms and $R'$ is primarily linear methylene repeating units containing from about 2 to about 8 carbon atoms.

8. The method of claim 1 wherein said oversprayed paint solids are derived from a low VOC paint formulation.

9. The method of claim 8 wherein said low VOC paint formulation is a two-component paint formulation.

* * * * *

UNITED STATES PATENT AND TRADEMARK OFFICE
CERTIFICATE OF CORRECTION

PATENT NO. : 5,098,450
DATED : March 24, 1992
INVENTOR(S) : Robert R. Patzelt and Edwin C. Zuerner It is certified that error appears in the above-identified patent and that said Letters Patent is hereby corrected as shown below:

In Column 13, line 4, delete "then referred" and substitute therefor
-- than preferred --.

Signed and Sealed this

First Day of June, 1993

MICHAEL K. KIRK

Attest:

Attesting Officer

Acting Commissioner of Patents and Trademarks